United States Patent [19]
Bowen

[11] Patent Number: 6,141,908
[45] Date of Patent: Nov. 7, 2000

[54] TRANSIT VEHICLE DOOR SYSTEM

[75] Inventor: Scott N. Bowen, Lindenhurst, Ill.

[73] Assignee: Westinghouse Air Brake Company, Wilmerding, Pa.

[21] Appl. No.: 09/134,065

[22] Filed: Aug. 13, 1998

[51] Int. Cl.[7] .............................. E05F 15/02; B60N 5/00
[52] U.S. Cl. ................................ 49/281; 49/248; 49/280; 49/246; 105/332; 105/341
[58] Field of Search ..................................... 105/332, 341, 105/343, 348; 296/146.4; 49/246, 248, 280, 281

[56] References Cited

U.S. PATENT DOCUMENTS

| | | | |
|---|---|---|---|
| 4,087,939 | 5/1978 | Elguindy et al. | 49/118 |
| 4,545,149 | 10/1985 | Jentsch | 49/255 |
| 4,854,223 | 8/1989 | Fink | 92/17 |
| 4,901,474 | 2/1990 | Bayard et al. | 49/26 |

*Primary Examiner*—S. Joseph Morano
*Assistant Examiner*—Frantz F. Jules
*Attorney, Agent, or Firm*—James Ray & Associates

[57] ABSTRACT

The invention provides a door system for a transit vehicle. It has an actuator which provides a rotary motion about an axis of the actuator for moving the door panel between an open position uncovering the aperture and a closed unlocked position covering the aperture. The actuator also provides a linear motion along the axis of the actuator for moving the door panel between the closed unlocked position and a closed locked position. The rotary motion followed by the axial motion is provided by a cylinder having a piston moved by fluid pressure. The piston includes a guide track in its exterior which engages rollers in the cylinder. The guide track has one portion curving around the piston and one portion parallel to the axis. The curving part provides the rotary motion and the straight part provides the axial motion. When the rotary motion is completed the piston encounters a stop on a shaft which supports the door. The actuator then moves the door axially to engage locks.

29 Claims, 9 Drawing Sheets

TRANSIT VEHICLE DOOR SYSTEM

FIELD OF THE INVENTION

The present invention relates, in general, to a transit vehicle door system and, more particularly, the instant invention relates to a door system having a fluid pressure actuator.

BACKGROUND OF THE INVENTION

The design of transit vehicle doors is crucial for the overall safety of the travelling public and they must function in a rather hostile environment. Such hostile environment at least includes heavy usage, temperature extremes, both vibration and acceleration loads, as well as spurious electrical signals which may be caused by lightning, by an interrupted contact with a third rail, and/or strong radio signals.

In many applications, an automatic actuation of the doors is required. An actuator for such a door must open and close the door without failure for a very large number of cycles. Also, a positive locking mechanism is generally needed. The locking mechanism should prevent accidental opening of the doors by any application of opening forces to the doors when the doors are closed.

Some prior art systems rely on the actuator to move the door to a closed position and then the actuator is locked to lock the door. This approach has the disadvantage that the locking loads are carried by arms mounted on the actuator which position the door in the closed position. This approach does not provide strong, solid locking.

A prior art unit made by Bode[a] has an actuator which has a vertical axis. A piston in the actuator which is driven upward by fluid pressure moves a screw which engages a nut. The nut supports and positions arms which, in turn, support and position the door. When the actuator begins a door-closing stroke, the door is rotated to the closed position. When it reaches the closed position, it can rotate no further. Continued displacement of the piston then moves the screw upward, moving the door with it. This upward motion of the door engages locks on the edges of the door. Then, if a force is applied to the door in the door-opening direction, the locks carry the load, not the arms. One drawback of this approach is that during the final upward movement of the door the actuator is exerting strong door closing forces. These strong door closing forces cause friction, which increases the force needed to lift the door.

SUMMARY OF THE INVENTION

In one aspect, the invention is a door system for covering and uncovering an aperture in a wall of a transit vehicle. The system includes a door panel and an actuator which provides a rotary motion about an axis of the actuator for moving the door panel between an open position, uncovering the aperture, and a closed unlocked position, covering the aperture. The actuator also provides a linear motion along the axis of the actuator for moving the door panel between the closed, unlocked position and a closed, locked position. The actuator includes a cylinder having an inner surface enclosing an internal chamber of the cylinder. This cylinder is coaxial with the axis of the actuator and has a first end and a second end. The actuator further includes a piston located in the internal chamber of the cylinder. Such piston has a guide track formed in its outer surface and is positioned coaxially with the axis of the actuator. This piston includes a first end and a second end. There is at least one seal disposed on the piston for sealing between the piston and the inner surface of the cylinder. The seal provides a pressure boundary between a first chamber adjacent the first end of the piston within the first end of the cylinder and a second chamber adjacent the second end of the piston within the second end of the cylinder. The system has a shaft passing through the cylinder and through a bore in the piston and positioned coaxially with the axis of the actuator. The shaft has a shaft rotary motion connection located on an outer surface thereof for engaging a piston rotary motion connection located within the bore of the piston. The shaft rotary motion connection and the piston rotary motion connection cooperating to provide a rotary connection between the shaft and the piston so that rotation of the piston causes rotation of the shaft. The rotary motion connection of the shaft and the rotary motion connection of the piston permit axial motion of the piston relative to the shaft. The shaft has a first external portion adjacent a first end of the cylinder and a second external portion adjacent a second end of the cylinder. There is at least one roller attached to the inner surface of the cylinder and engaged with the guide track. The guide track has a first portion curving obliquely around the piston and a second portion running parallel to the axis of the piston, so that when the roller is in the first portion of the guide track, motion of the piston parallel to the axis of the cylinder causes rotation of the piston and, when the roller is in the second portion of the guide track, motion of the piston parallel to the axis of the cylinder does not cause rotation of the piston. There is a stop on the shaft for engaging the piston so that when the piston is moved into contact with the stop further axial motion of the piston causes axial motion of the shaft. The stop is positioned so that when the roller is in the first portion of the guide track the piston is not in contact with the stop and so that rotary, but not axial motion, is communicated to the shaft. When the roller is in the second portion of the guide track, the piston is in contact with the stop and causes axial motion of the shaft. In this manner, axial motion of the piston provides a first rotary motion of the shaft and a second axial motion of the shaft. The actuator has at least one fluid connection to the first chamber for controlling the fluid pressure in the first chamber to control a first pressure force on the piston and thereby control the axial motion of the piston. The actuator also has at least one fluid connection to the second chamber for controlling the fluid pressure in the second chamber to control a second pressure force on the piston and thereby control the axial motion of the piston. A first arm is attached to the first external portion of the shaft and is connected through a pivot to the door panel for supporting and positioning such door panel. A second arm is attached to the second external portion of the shaft and is also connected through a pivot to the door panel for supporting and positioning the door panel. The door system also includes a lock having a vehicle lock portion attached to the transit vehicle adjacent the aperture and a door panel lock portion attached to the door panel. The door panel lock portion engages the vehicle lock portion during the second axial motion of the shaft.

In another aspect, the present invention provides an actuator for moving a door panel to cover and uncover an aperture in a wall of a transit vehicle. The actuator provides a rotary motion about an axis of the actuator for moving the door panel between an open position, uncovering the aperture, and a closed unlocked position covering the aperture. The actuator also provides a linear motion along the axis of the actuator for moving the door panel between the closed unlocked position and a closed locked position. The actuator includes a cylinder having an inner surface enclosing an internal chamber of the cylinder. Such cylinder is disposed coaxial with the axis of the actuator and has a first end and a second end. The actuator also has a piston located in the internal chamber of the cylinder which has a guide track formed in its outer surface. The piston is positioned coaxially with the axis of the actuator and has a first end and a second end. There is at least one seal on the piston for sealing between the piston and the cylinder. Such seal provides a pressure boundary between a first chamber adjacent the first end of the piston within the first end of the cylinder and a second chamber adjacent the second end of the piston within the second end of the cylinder. The system has a shaft passing through the cylinder and through a bore in the piston. The shaft is positioned coaxially with the axis of the actuator. There is a shaft rotary motion connection located on an outer surface of the shaft for engaging a piston rotary motion connection located within the bore of the piston. The shaft rotary motion connection and such piston rotary motion connection cooperating to provide a rotary connection between the shaft and the piston so that rotation of the piston causes rotation of the shaft. The rotary motion connection of the shaft and the rotary motion connection of the piston permit axial motion of the piston relative to the shaft. The shaft has a first external portion adjacent a first end of the cylinder and a second external portion adjacent a second end of the cylinder. There is at least one roller attached to the inner surface of the cylinder and engagable with the guide track. The guide track has a first portion curving obliquely around the piston and a second portion running parallel to the axis of the piston. In this manner, when the roller is in the first portion of the guide track, motion of the piston parallel to the axis of the cylinder causes rotation of the piston and when the roller is in the second portion of the guide track, motion of the piston parallel to the axis of the cylinder does not cause rotation of the piston. There is a stop on the shaft for engaging the piston so that when the piston is moved into contact with the stop further axial motion of the piston causes axial motion of the shaft. The stop is positioned so that when the roller is in the first portion of the guide track the piston is not in contact with the stop so that rotary but not axial motion is communicated to the shaft. When the roller is in the second portion of the guide track the piston is in contact with the stop and causes axial motion of the shaft. In this manner, axial motion of the piston provides a first rotary motion of the shaft and a second axial motion of the shaft. The actuator has at least one fluid connection to the first chamber for controlling the fluid pressure in the first chamber to control a pressure force on the piston and thereby control the axial motion of the piston. The actuator also has at least one fluid connection to the second chamber for controlling the fluid pressure in the second chamber to control a pressure force on the piston and thereby control the axial motion of the piston.

OBJECTS OF THE INVENTION

It is, therefore, one of the primary objects of the present invention to provide a transit vehicle door system having an actuator which provides a rotary motion of a shaft to which arms are attached which support the door, the rotary motion opening and closing the door.

Another object of the present invention is to provide a transit vehicle door system having an actuator which moves the door to a closed position and then translates the door linearly to cause locks to engage to lock the door.

Still another object of the present invention is to provide a transit vehicle door system having arms to support the door which have a relatively-large spread between the arms.

Yet another object of the present invention is to provide a transit vehicle door system having an actuator and one arm above the actuator and another arm below the actuator to provide a relatively large spread between the arms to thereby provide a positive support of the door.

A further object of the present invention is to provide a transit vehicle door system which uses boomerang arms and at least one guide rod to open the door by moving it along an arcuate path without rotating it and placing it adjacent the outside wall of the transit vehicle.

It is an additional object of the present invention to provide a transit vehicle door which substantially minimizes pinch points associated with some prior art boomerang arms.

Still yet another object of the present invention is to provide a transit vehicle door which, after being moved to the closed position, is moved upward to engage locks which prevent the door from opening.

Yet still another object of the present invention is to provide a transit vehicle door which, after being moved to the closed position, is moved downward to engage locks which prevent the door from opening.

A still further object of the present invention is to provide an actuator for a transit vehicle door which, when energized, produces a rotary motion of the door and subsequently a linear motion of the door.

Still a further object of the present invention is to provide an actuator for a transit vehicle door which provides a profiled speed for opening and closing to substantially minimize high accelerations at the beginning and end of a door closing or opening motion.

An additional object of the present invention is to provide an actuator for a door with integrated opening and closing speed controls.

Another object of the present invention is to provide an actuator for a transit vehicle door which uses fluid pressure for opening and closing the door thereby minimizing inadvertent opening and closing due to electromagnetic interference.

A further object of the present invention is to provide an actuator for a transit vehicle door which is energized by air pressure.

Yet another object of the present invention is to provide a piston having equal areas for fluid pressure on both sides so that the actuator is balanced if both sides of the piston are exposed to equal pressures.

An additional object of the present invention is to provide an actuator which can be stopped at any partial stroke position by stopping fluid flow into and out of the cylinder.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
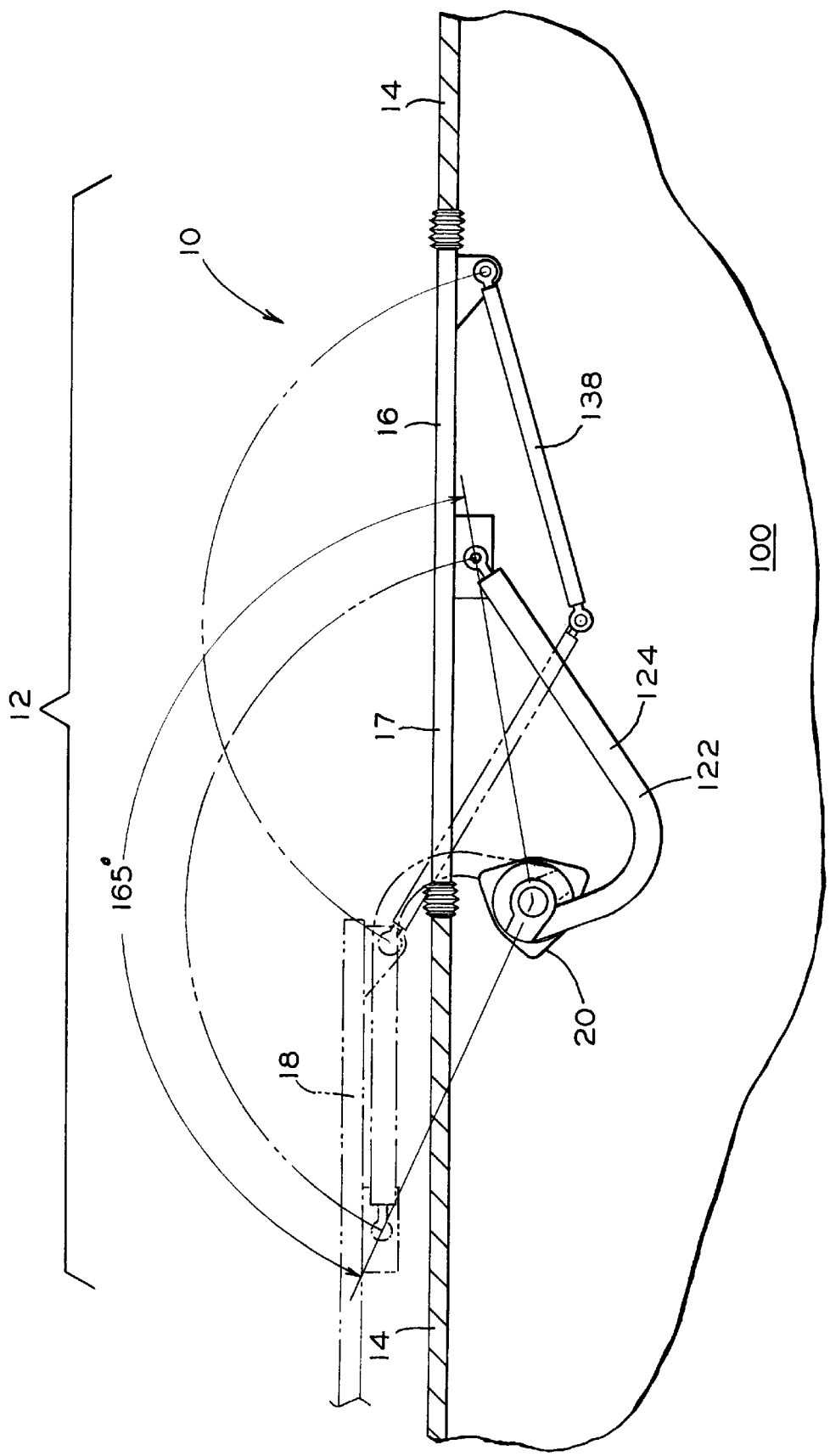
FIG. 1 is a plan view which schematically illustrates a presently preferred embodiment of the invention mounted on a transit vehicle.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures, for the sake of clarity and understanding of the invention.

Reference is now made, more particularly, to FIG. 1. Illustrated therein is a presently preferred embodiment of a door system, generally designated 10, mounted on a transit vehicle 100. Door system 10 covers and uncovers an aperture 12 disposed in a wall 14 of a transit vehicle 100. The door system 10 includes a door panel 16 which is moved by an actuator 20 between a closed position 17 and an open position 18. The actuator 20 provides a rotary motion, about an axis of such actuator 20, for moving the door panel 16 between the open position 18 which uncovers such aperture 12 and the closed unlocked position 17 covering such aperture 12. Actuator 20 also provides a linear motion along the axis 22 of the actuator 20 for moving the door panel between the closed unlocked position 17 and a closed locked position 19 (not shown in this figure).

Figure 2:
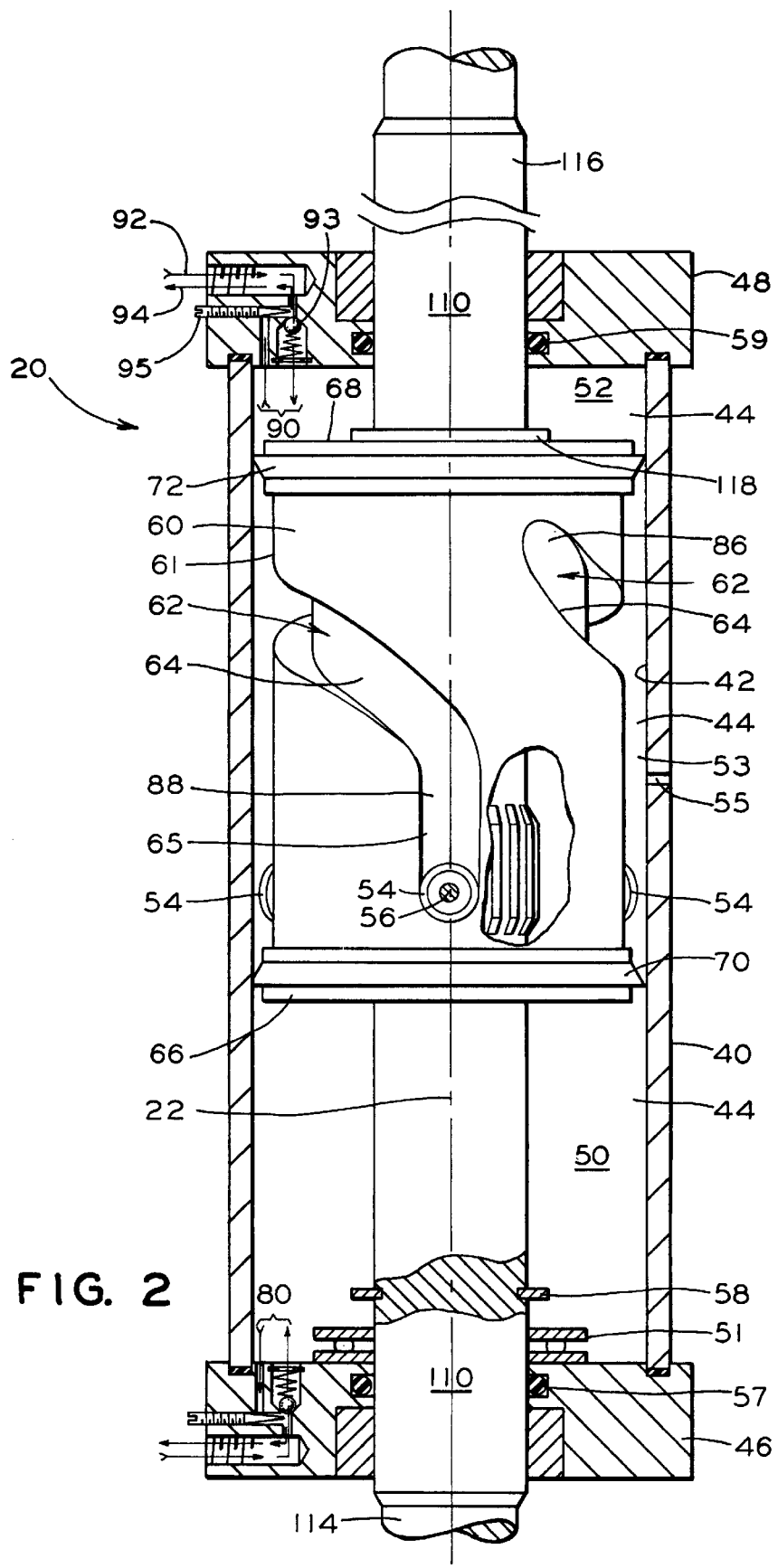
FIG. 2 is a side elevation view partially in cross-section which illustrates a partial median section of a presently preferred actuator of the invention.

As shown in FIG. 2, the actuator 20 includes a cylinder 40 10 having an inner surface 42 which encloses an internal chamber 44 of the cylinder 40. The cylinder is aligned coaxial with the axis 22 of the actuator 20 and has a first end 46 and a second end 48.

The actuator 20 also has a piston 60 located in the internal chamber 44 of the cylinder 40. The piston 60 has a guide track 62 formed in its outer surface 61. The piston 60 is positioned coaxially with the axis 22 of actuator 20 and has a first end 66 and a second end 68. There is at least one seal member 70 on the piston 60 for sealing between the outer surface of the piston 60 and the inner surface 42 of cylinder 40. Such sealing member 70 provides a pressure boundary between a first chamber 50 adjacent the first end 66 of the piston 60 within the first end 46 of the cylinder 40 and a second chamber 52 adjacent the second end 68 of the piston 60 within the second end 48 of the cylinder 40.

Figure 3A:
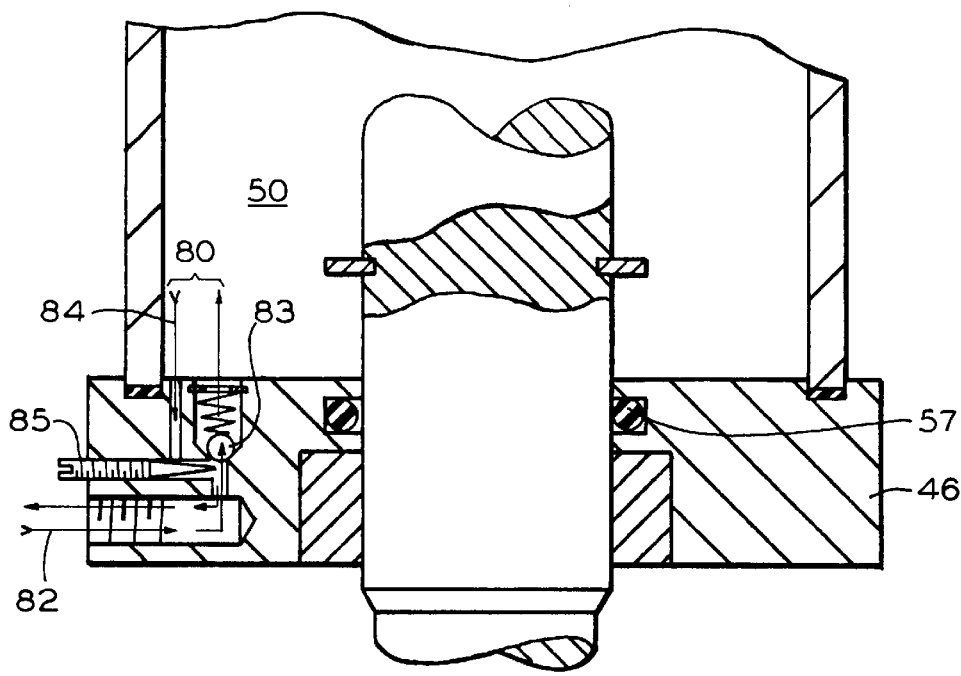
FIG. 3A is a side elevation view partially in cross-section which illustrates the flow connections to the first chamber of the cylinder used in the actuator illustrated in FIG. 2.

Reference is now made to FIG. 3A which illustrates a presently preferred embodiment of a fluid connection 80 to such first chamber 50. Fluid connection 80 provides control of pressure in the first chamber 50 for control of a first pressure force to be exerted on piston 60. Fluid connection 80 includes a low impedance connection 82 having check valve 83 to provide a low impedance path into first chamber 50. Such low impedance fluid connection 82 does not permit flow from such first chamber 50 due to a check valve 83. There is a high impedance connection 84 having a needle valve 85 which can be adjusted to control the fluid flow from the chamber 50 to control the door opening speed.

Figure 3B:
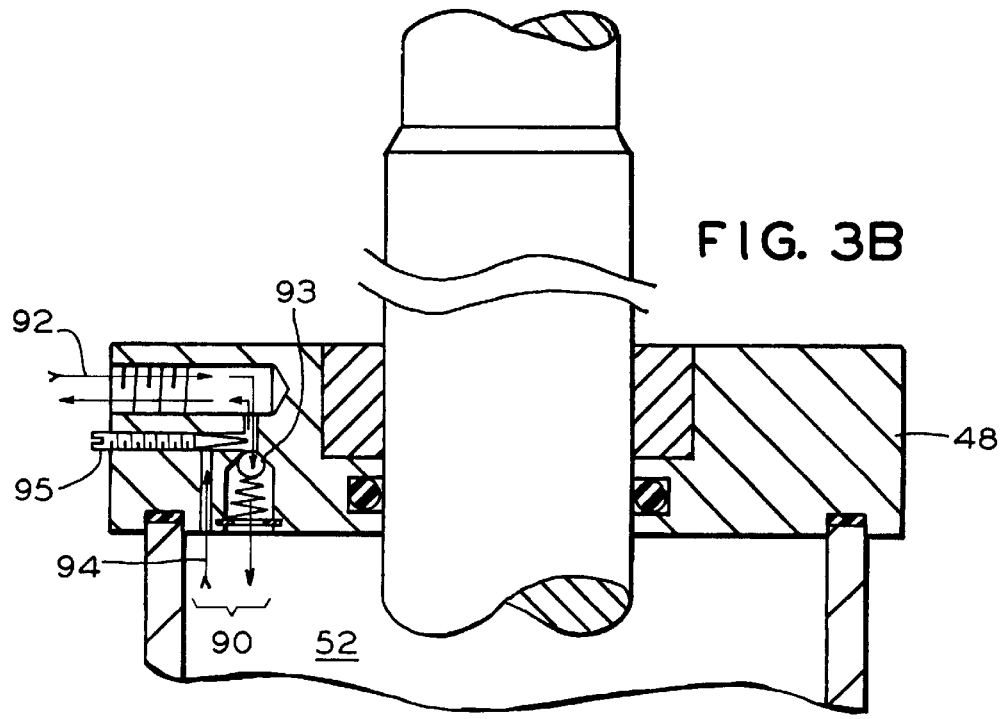
FIG. 3B is a side elevation view partially in cross-section which illustrates the flow connections to the second chamber of the cylinder used in the actuator illustrated in FIG. 2.

In FIG. 3B there is illustrated a presently preferred embodiment of a fluid connection 90 to enable fluid communication with the second chamber 52. Fluid connection 90 provides control of pressure in second chamber 52 for control of a second pressure force exerted on the piston 60. Fluid connection 90 includes a low impedance connection 92 having a check valve 93 to provide a low impedance path into such second chamber 52. Such low impedance fluid connection 92 does not permit flow from the second chamber 52 due to the check valve 93. There is also a high impedance connection 94 having a needle valve 95 which can be adjusted to control fluid flow from such second chamber 52 to control the door closing speed.

Figure 4:
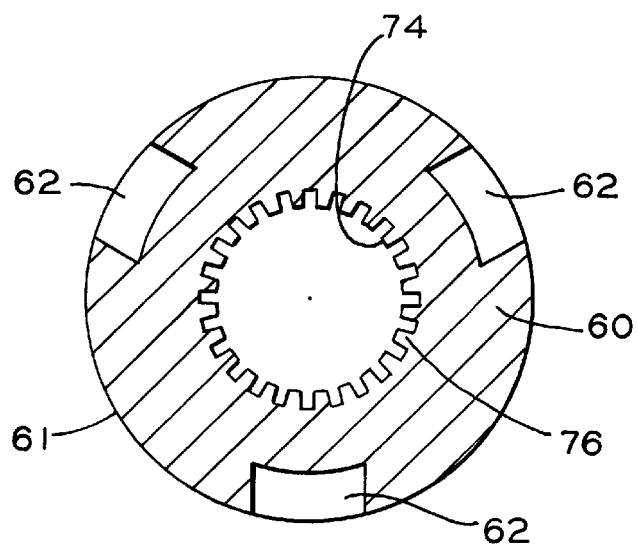
FIG. 4 is a transverse cross-sectional view of the piston illustrated in FIG. 2.
Figure 5:
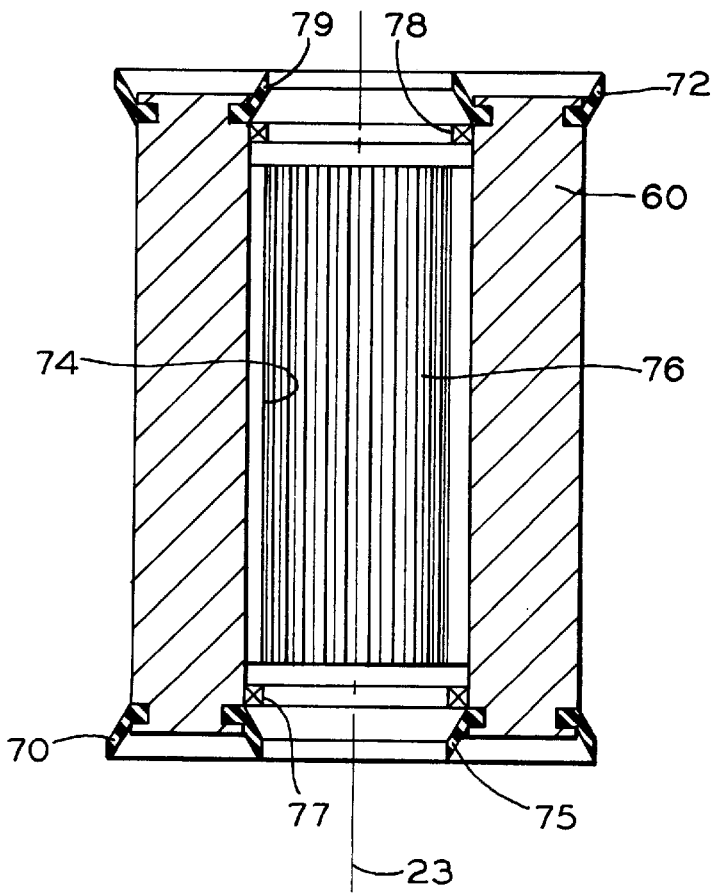
FIG. 5 is a longitudinal cross-sectional view of the piston illustrated in FIG. 2.

Reference is now directed to FIGS. 4 and 5, which illustrate piston 60 in greater detail. As seen in FIG. 4, piston 60 includes three guide tracks 62. These guide tracks 62 engage rollers 54 which are mounted on the inner surface 42 of the cylinder 40, seen in FIG. 2. Guide tracks 62 coact with such rollers 54 to cause piston 60 to rotate when a net axial force on such piston 60, including a pressure force exerted due to a pressure difference between first chamber 50 and second chamber 52, moves it parallel to axis 22 of actuator 20. Rotary motion of piston 60 is communicated to the shaft 110 by a piston rotary motion connection 76 in bore 74 of piston 60, which preferably is an inside spline. Piston rotary motion connection 76 engages a shaft rotary motion connection 112, which is, also, preferably a spline.

As seen in FIG. 5, a first piston radial bearing 77 and a second piston radial bearing 78 engage the shaft 110 to center such piston 60 so that the axis 23 of piston 60 is aligned with axis 22 of such actuator 20. As further seen in FIG. 5, a first piston shaft seal 75 and a second piston shaft seal 79 are provided to prevent leakage of fluid between the shaft 110 and the bore 74 of such piston 60.

Figure 6:
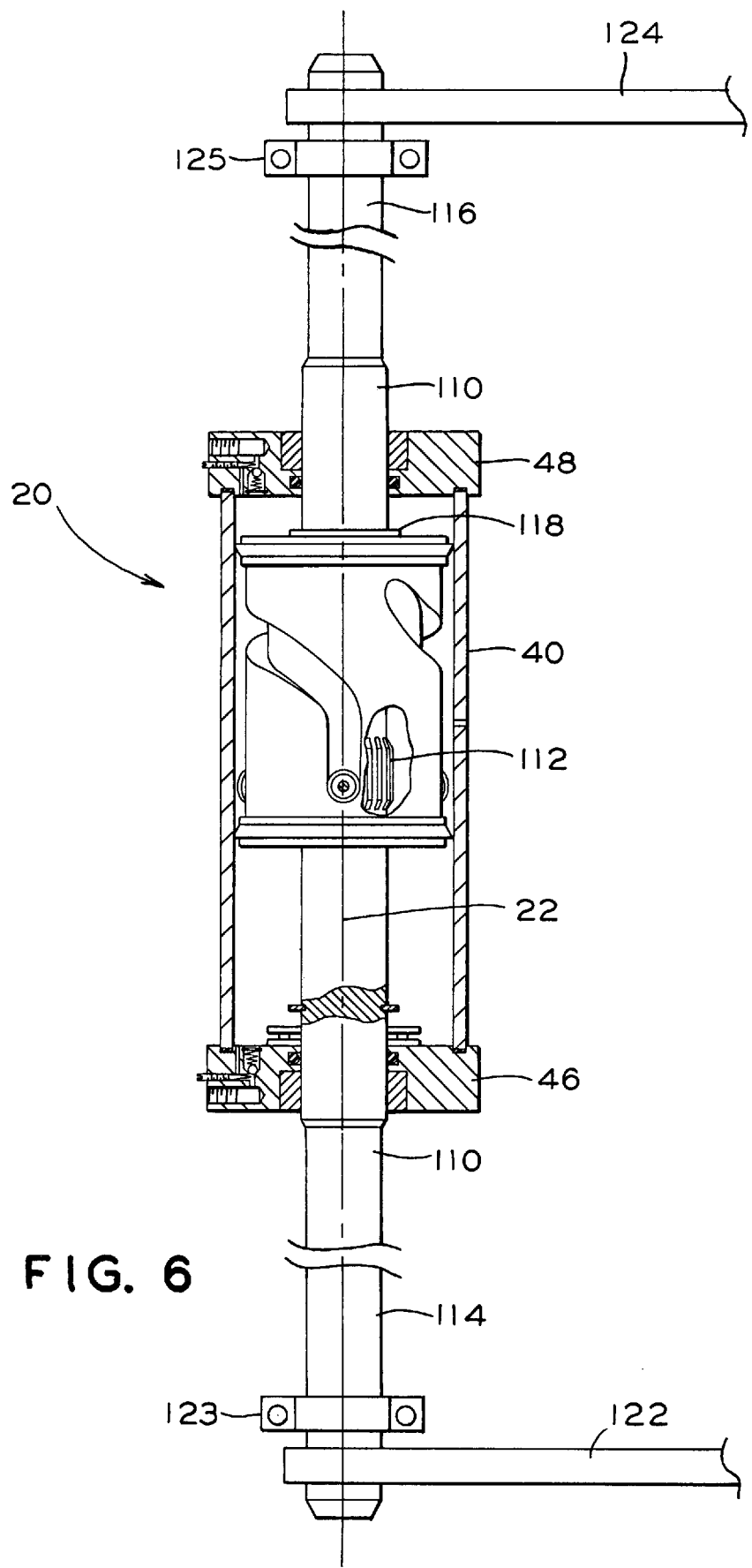
FIG. 6 is a broken side elevation view that is partially in cross-section which illustrates the boomerang arms attached to the shaft illustrated in FIG. 2.

The actuator 20, in the presently preferred embodiment of the invention shown in FIG. 6, is mounted with its axis 22 disposed in a vertical direction. Actuator 20 provides an axial motion of shaft 110 which passes through the cylinder 40 and through bore 74 in the piston 60. Such shaft 110 is positioned coaxially with the axis 22 of the actuator 20. The shaft 110 includes a shaft rotary motion connection 112 located on such shaft 110 for engaging the piston rotary motion connection 76 located within the bore 74 of the piston 60.

The shaft rotary motion connection 112 and the piston rotary motion connection 76 cooperate to provide a rotary connection between the shaft 110 and the piston 60 so that rotation of the piston 60 causes rotation of the shaft 110. The shaft rotary motion connection 112 and the piston rotary motion connection 76 permit axial motion of the piston 60 relative to the shaft 110. The shaft 110 includes a first external portion 114 disposed adjacent a first end 46 of the cylinder 40 and a second external portion 116 disposed adjacent a second end 48 of the cylinder 40.

At least one roller 54 (FIG. 2) is attached to the inner surface 42 of the cylinder 40 which engages the guide track 62. The guide track 62 has a first portion 64 curving obliquely around the piston 60 and a second portion 65 running parallel to the axis 22. When the roller 54 is in the first portion of the guide track 62, motion of the piston 60 parallel to the axis 23 of the piston 60 causes rotation of the piston 60 and when the roller 54 is in the second portion 65 of the guide track 62, motion of the piston 60 parallel to the axis 23 of the piston 60 does not cause rotation of the piston 60.

There is a stop 118 disposed on the shaft 110 for engaging the piston 60 so that when the piston 60 is moved into contact with the stop 118 further axial motion of the piston 60 causes axial motion of the shaft 110. In the presently preferred embodiment of the invention, stop 118 is a snap ring. The stop 118 is positioned so that when the roller 54 is in the first portion 64 of the guide track 62 the piston 60 is not in contact with the stop 118 and so that rotary but not axial motion is communicated to the shaft 110. When the roller is in the second portion 65 of the guide track 62 the piston 60 is in contact with the stop 118 and causes an axial motion of the shaft 110. In this manner, axial motion of the piston 60 provides a first rotary motion of the shaft 110 and a second axial motion of the shaft 110.

As seen in FIG. 6, a first arm 122 is attached to the first external portion 114 of shaft 110. First arm 122 is connected to the door panel 16 for both supporting and positioning the door panel 16. A first shaft bearing 123 is, preferably, included for added support. A second arm 124 is attached to a second external portion 116 of shaft 110. The second arm 124 is connected to the door panel 16 for supporting and positioning the door panel 16. There is a second shaft bearing 125 preferably included for added support. Preferably, arms 122 and 124 are curved to reach around an edge of aperture 12. In the presently preferred embodiment, such first arm 122 and such second arm 124 are boomerang arms, as are known in the transit vehicle door art.

Figure 7:
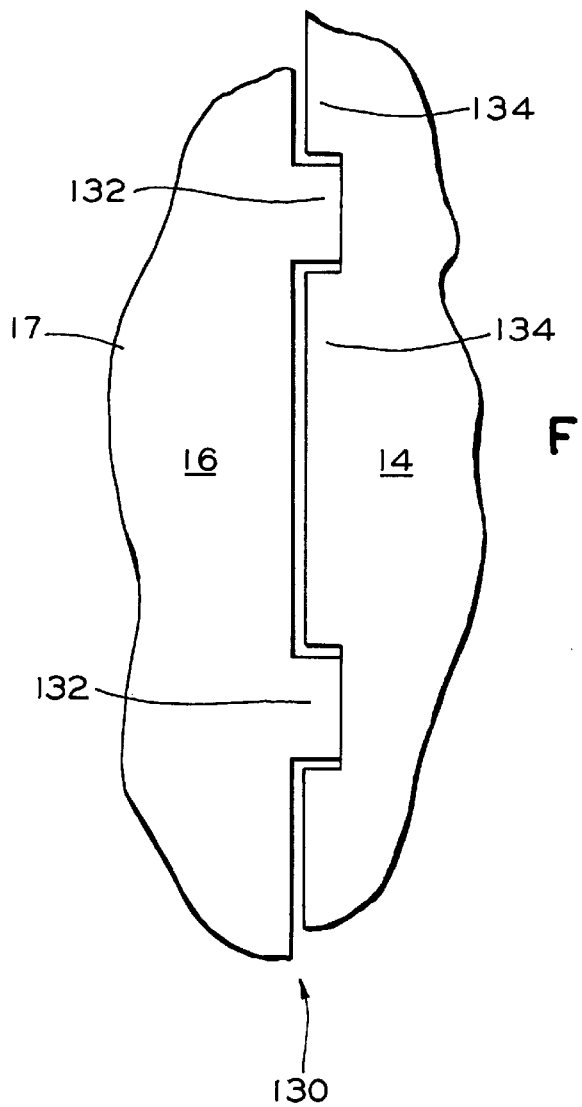
FIG. 7 is a partial front elevation view of the presently preferred door panel lock portions and vehicle lock portions with the door in the closed unlocked position.
Figure 8:
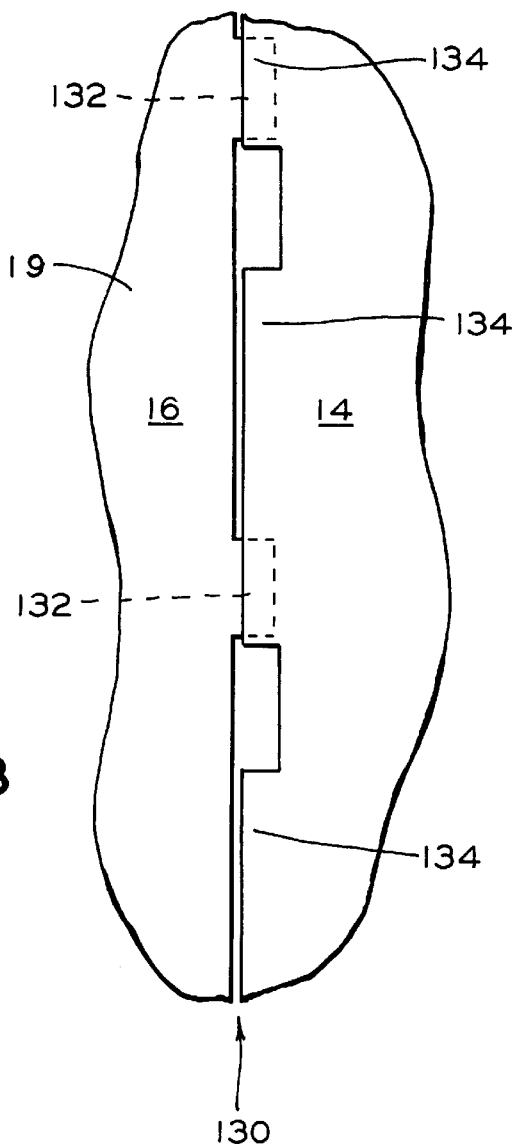
FIG. 8 is a partial front elevation view which shows the door panel lock portions illustrated in FIG. 7 engaging vehicle lock portions.

Refer now to FIGS. 7 and 8. Illustrated therein is a lock member 130 which includes one or more vehicle lock portions 134 attached to the wall 14 of transit vehicle 100 adjacent the aperture 12 and one or more door panel lock portions 132 attached to the door panel 16. The door panel lock portions 132 engage the vehicle lock portions 134 during the second axial motion of the shaft 110. FIG. 7 shows door panel 16 in a closed unlocked position 17 and FIG. 8 shows such door panel 16 in a closed locked position 19. In the presently preferred embodiment, door panel lock portions 132 are positioned behind the vehicle lock portions 134 when engaged.

In the presently preferred embodiment, as shown in FIG. 1, a guide rod 138 is connected to the door panel 16 to control the movement of such door panel 16 from the closed position 17 to the open position 18. Preferably, guide rod 138 is positioned above the ceiling of the transit vehicle 100.

Figure 9:
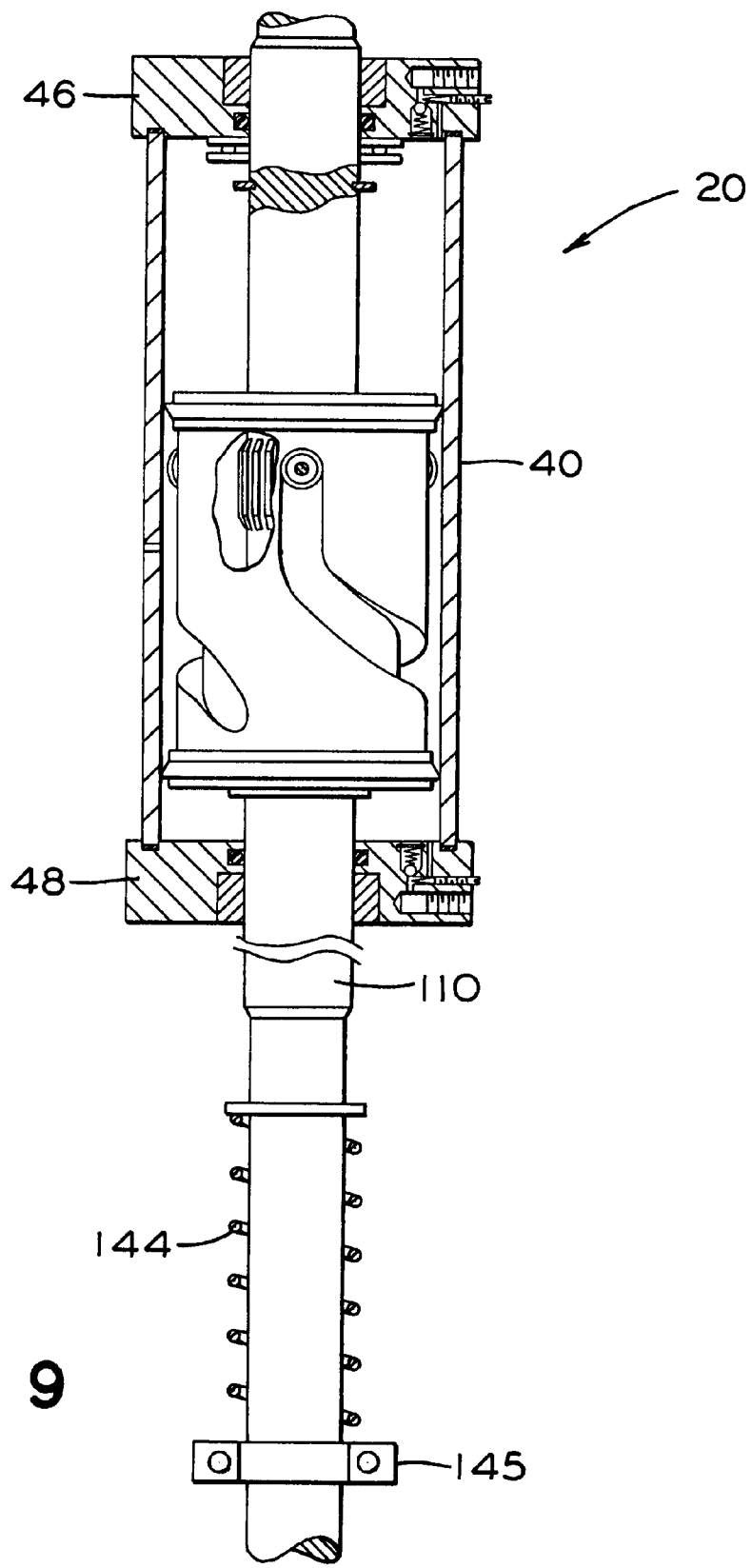
FIG. 9 is a side elevation view partially in cross-section which illustrates a presently preferred external spring arrangement for supporting a downwardly-actuated door.
Figure 10:
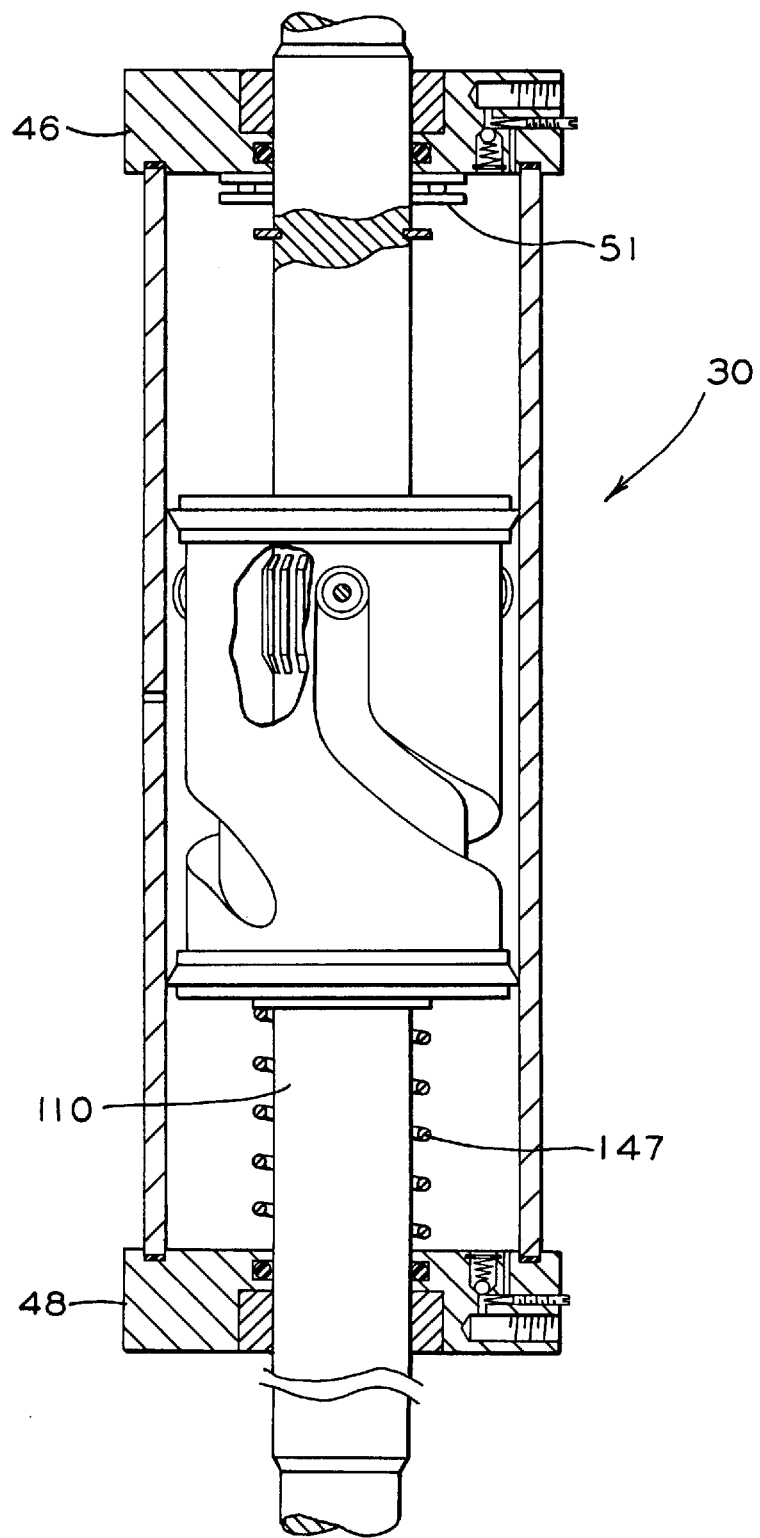
FIG. 10 is a side elevation view partially in cross-section which illustrates a presently preferred internal spring arrangement for supporting a downwardly-activated door.

FIGS. 9 and 10 show embodiments in which the door panel 16 is moved downward to engage with one or more of the locks 130. For the downward moving door panel 16, a spring 144 or 147 is added to support the weight of such door panel 16. In this manner, the door panel 16 can be manually opened in the event of a loss of fluid pressure. As seen in FIG. 9, spring 144 is mounted external to the actuator 20 to engage and support the shaft 110. For this application, actuator 20 is inverted, as shown, so that actuation moves the door panel 16 downward to engage locks 130.

Illustrated in FIG. 10 is an actuator 30 which includes a spring 147 supporting shaft 110 to support door panel 16. Such actuator 30, when energized, moves the shaft 110 downward to engage locks 130.

In a presently preferred embodiment of the invention, illustrated in FIG. 2, there is a thrust bearing 51 disposed at the first end 46 of cylinder 40 in actuator 20 to reduce friction during rotation of the door panel 16 due to the weight of such door panel 16. This occurs when roller 54 is in the first portion 64 of guide track 62. Alternatively, as seen in FIG. 10, such thrust bearing 51 is located in an inverted position in actuator 30 to reduce such friction during rotation of such door panel 16 due to the thrust of spring 147. This occurs when the roller 54 is in the first portion 64 of guide track 62.

Preferably, the roller 54 has an axis 56 which is radial relative to the cylinder 40. Preferably, there are three such rollers 54 disposed at angles of 120 degrees relative to one another. For this case, the piston 60 has three guide tracks 62, as shown in FIG. 4.

Preferably, the shaft rotary motion connection 112 is a spline shaft portion and the piston rotary motion connection 76 is an internal spline.

In the presently preferred embodiment, as shown in FIG. 2, seal 70 is located at the first end 66 of the piston 60 and a second seal 72 is located at the second end 68 of such piston 60 to seal off an annular space 53 between such piston 60 and the cylinder 40. It is also preferred that a port 55 be included, as shown in FIG. 2, so that the pressure in annular space 53 is atmospheric.

As best seen in FIG. 5, there is at least one shaft seal 75 positioned to provide a seal between the shaft 110 and piston 60. Preferably, a second shaft seal 79 is, also, provided to seal between such shaft 110 and the piston 60. Additionally, it is presently preferred that a bearing 77 be attached to the piston 60 to locate such piston 60 relative to the shaft 110. Preferably, a second bearing 78 is also included for that purpose.

In the presently preferred embodiment, as shown in FIG. 2, a shaft seal 57 is provided at the first end 46 of such cylinder 40 to prevent fluid loss from the first chamber 50. Likewise, it is preferred that a second seal 59 be provided at the second end 48 of such cylinder 40 to prevent fluid loss from the second chamber 52.

It is preferred that the first end 86 of the first portion 64 of guide track 62 be curved toward a direction parallel to axis 22 to provide a moderate acceleration of the door panel 16 when a closing motion is begun, or an opening motion is completed.

It is also preferred that the second end 88 of the first portion 64 of guide track 62 be curved toward a direction parallel to axis 22 to provide a moderate acceleration of door panel 16 when an opening motion is begun, or a closing motion is completed.

Figure 11:
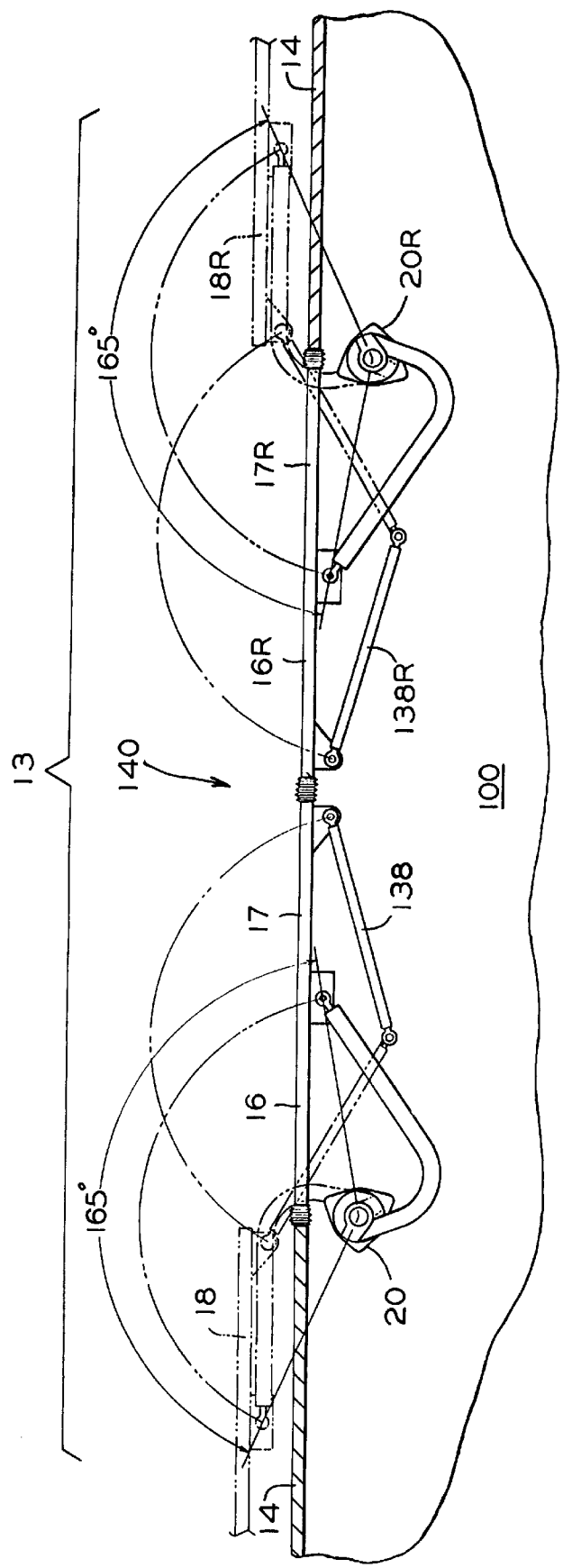
FIG. 11 is a plan view which schematically illustrates a presently preferred embodiment of the invention mounted on a transit vehicle equipped with a biparting door system.

Illustrated in FIG. 11 is a biparting door system 140, according to the present invention. In addition to door panel 16, there is also a second door panel 16R which seals against door panel 16. Actuator 20R moves door panel 16R to position 17R when actuator 20 moves panel 16 to position 17 for covering aperture 13. Likewise, when actuator 20 moves door panel 16 to position 18, actuator 20R moves the door panel 16R to position 18R, which is the open position. The actuator 20R is substantially symmetrical to such actuator 20 and door panel 16R is substantially symmetrical to the door panel 16 and guide rod 138R is substantially symmetrical to the guide rod 138.

While a presently preferred and various additional alternative embodiments of the instant invention have been described in detail above, in accordance with the patent statutes, it should be recognized that various other modifications and adaptations of the invention may be made by those persons who are skilled in the relevant art without departing from either the spirit of the invention or the scope of the appended claims.

I claim:

1. A door system for covering and uncovering an aperture disposed in a sidewall portion of a transit vehicle, said door system comprising:

(a) at least one door panel;

(b) an actuator providing both a rotary motion about an axis of said actuator for moving said at least one door panel between an open position uncovering such aperture and a closed unlocked position covering such aperture and a linear motion along said axis for moving said at least one door panel between said closed unlocked position and a closed locked position, said actuator including:

(i) a cylinder disposed coaxial with said axis of said actuator, said cylinder having a first end and a second end and an inner surface enclosing an internal chamber of said cylinder, (ii) a piston positioned coaxially with said axis of said actuator and disposed in said internal chamber of said cylinder, said piston having a first end and a second end and a guide track formed in an outer surface thereof, (iii) at least one seal disposed on said piston for both sealing between said piston and said cylinder and providing a pressure boundary between a first chamber disposed adjacent said first end of said piston within said first end of said cylinder and a second chamber disposed adjacent said second end of said piston within said second end of said cylinder, (iv) a shaft having a first external portion disposed adjacent said first end of said cylinder and a second external portion disposed adjacent said second end of said cylinder is positioned coaxially with said axis of said actuator and passes through both said cylinder and a bore formed in said piston, said shaft having a shaft rotary motion connection disposed thereon for engaging a piston rotary motion connection disposed within said bore of said piston, said shaft rotary motion connection and said piston rotary motion connection cooperating to provide a rotary connection between said shaft and said piston so that rotation of said piston causes rotation of said shaft, said rotary motion connection of said shaft and said rotary motion connection of said piston permitting axial motion of said piston relative to said shaft, (v) at least one roller attached to said inner surface of said cylinder and engaging said guide track, said guide track having a first portion curving obliquely around said piston and a second portion running parallel to said axis of said piston so that when said roller is in said first portion of said guide track motion of said piston parallel to said axis of said cylinder causes rotation of said piston and when said roller is in said second portion of said guide track motion of said piston parallel to said axis of said cylinder rotation of said piston is inhibited, (vi) a stop disposed on said shaft for engaging said piston so that when said piston is moved into contact with said stop further axial motion of said piston causes axial motion of said shaft, said stop being positioned so that when said roller is in said first portion of said guide track said piston is not in contact with said stop so that rotary but not axial motion is communicated to said shaft and so that when said roller is in said second portion of said guide track said piston is in contact with said stop and causes axial motion of said shaft whereby axial motion of said piston provides a first rotary motion of said shaft and a second axial motion of said shaft, (vii) at least one fluid connection disposed in fluid communication with said first chamber of said actuator for controlling a fluid pressure in said first chamber to control a first pressure force exerted on said piston and thereby control said axial motion of said piston, and (viii) at least one fluid connection disposed in fluid communication with said second chamber of said actuator for controlling a fluid pressure in said second chamber to control a second pressure force exerted on said piston and thereby control said axial motion of said piston;

(c) a first arm attached to said first external portion of said shaft and connected to said at least one door panel for both supporting and positioning said at least one door panel;

(d) a second arm attached to said second external portion of said shaft and connected to said at least one door panel for both supporting and positioning said at least one door panel; and (e) a lock having a vehicle lock portion attached to such transit vehicle adjacent such aperture and a door panel lock portion attached to said at least one door panel, said door panel lock portion engaging said vehicle lock portion during said second axial motion of said shaft.

2. A door system, according to claim 1, wherein said door panel lock portion moves behind said vehicle lock portion to prevent opening of said at least one door panel.

3. A door system, according to claim 1, wherein said first arm and said second arm are both curved to reach around an edge of such aperture to position said at least one door panel in said open position.

4. A door system, according to claim 3, wherein said door system further includes at least one guide rod cooperating with both said first arm and said second arm for controlling movement of said at least one door panel from said closed unlocked position to said open position.

5. A door system, according to claim 3, wherein each of said first arm and said second arm are boomerang arms.

6. A door system, according to claim 1, wherein said at least one door panel moves upward to engage said door panel lock portion with said vehicle lock portion.

7. A door system, according to claim 1, wherein said at least one door panel moves downward to engage said door panel lock portion with said vehicle lock portion.

8. A door system, according to claim 7, wherein said door system further includes a spring to support said at least one door panel in event of fluid pressure being lost from said cylinder so that said at least one door panel can be opened.

9. A door system, according to claim 8, wherein said spring is mounted external to said cylinder and engages said shaft to urge said shaft upward.

10. A door system, according to claim 1, wherein said door system includes a pair of door panels and a second door panel of said pair of door panels is moved by a second actuator, said second door panel being closed and sealed against a first door panel of said pair of door panels when said first door panel is closed.

11. An actuator for moving a door panel to cover and uncover an aperture in a side wall of a transit vehicle, said actuator providing both a rotary motion about an axis of said actuator for moving such door panel between an open position uncovering such aperture and a closed unlocked position covering such aperture and a linear motion along said axis for moving such door panel between said closed unlocked position and a closed locked position, said actuator comprising:

(a) a cylinder coaxially aligned with said axis of said actuator and having an inner surface enclosing an internal chamber of said cylinder;

(b) a piston disposed in said internal chamber of said cylinder and positioned coaxially with said axis of said actuator, said piston having a guide track formed in an outer surface thereof;

(c) at least one seal disposed on said piston for sealing between said piston and said cylinder, said at least one seal providing a pressure boundary between a first chamber disposed adjacent a first end of said piston and a second chamber disposed adjacent a second end of said piston;

(d) a shaft positioned coaxially with said axis of said actuator and passing through both said cylinder and a bore formed in said piston, said shaft having a shaft rotary motion connection disposed thereon for engaging a piston rotary motion connection disposed within said bore of said piston, said shaft rotary motion connection and said piston rotary motion connection cooperating to provide a rotary connection between said shaft and said piston so that rotation of said piston causes rotation of said shaft, said rotary motion connection of said shaft and said rotary motion connection of said piston permitting axial motion of said piston relative to said shaft;

(e) at least one roller attached to said inner surface of said cylinder and engaged with said guide track, said guide track having a first portion curving obliquely around said piston and a second portion running parallel to said axis of said piston so that when said roller is in said first portion of said guide track motion of said piston parallel to said axis of said cylinder causes rotation of said piston and when said roller is in said second portion of said guide track motion of said piston parallel to said axis of said cylinder inhibits rotation of said piston;

(f) a stop disposed on said shaft for engaging said piston so that when said piston is moved into contact with said stop further axial motion of said piston causes axial motion of said shaft, said stop being positioned so that when said roller is in said first portion of said guide track said piston is out of contact with said stop so that rotary but not axial motion is communicated to said shaft and so that when said roller is in said second portion of said guide track said piston is in contact with said stop and causes axial motion of said shaft, whereby axial motion of said piston provides a first rotary motion of said shaft and a second axial motion of said shaft;

(g) at least one fluid connection disposed in fluid communication with said first chamber of said actuator for controlling a fluid pressure in said first chamber to control a first pressure force exerted on said piston and thereby control said axial motion of said piston; and (h) at least one fluid connection disposed in fluid communication with said second chamber of said actuator for controlling a fluid pressure in said second chamber to control a second pressure force exerted on said piston and thereby control said axial motion of said piston.

12. An actuator, according to claim 11, wherein said actuator further includes a thrust bearing for supporting said shaft and hence such door panel when said roller is in said first portion of said guide track.

13. An actuator, according to claim 11, wherein said roller has a roller axis directed generally radially relative to said cylinder.

14. An actuator, according to claim 11, wherein said actuator includes three rollers disposed at about 120 degrees relative to each other around said inner surface of said cylinder and said piston has three guide tracks disposed at about 120 degrees relative to each other around said outer surface of said piston.

15. An actuator, according to claim 11, wherein said shaft rotary motion connection is a spline portion.

16. An actuator, according to claim 11, wherein said piston rotary motion connection is a spline portion.

17. An actuator, according to claim 11, wherein said at least one seal is located at said first end of said piston and said actuator further includes a second seal at said second end of said piston so that an annular space surrounding said piston is sealed off from both said first chamber and said second chamber.

18. An actuator, according to claim 17, wherein said actuator further includes a port formed through a wall of said cylinder adjacent said annular space to communicate atmospheric air to said annular space.

19. An actuator, according to claim 11, wherein said actuator further includes at least one shaft seal attached to said piston and contacting said shaft to prevent fluid loss along said shaft.

20. An actuator, according to claim 11, wherein said actuator further includes at least a shaft seal attached to said first end of said cylinder to prevent fluid loss from said first chamber.

21. An actuator, according to claim 11, wherein said actuator further includes at least a shaft seal attached to said second end of said cylinder to prevent fluid loss from said second chamber.

22. An actuator, according to claim 11, wherein said actuator further includes at least one bearing to maintain said piston coaxial with said cylinder.

23. An actuator, according to claim 11, wherein said guide track is profiled so that a first end of said first portion of said guide track is curved toward a direction of said axis to provide a moderate acceleration of such door panel when at least one of a closing motion is begun and an opening motion is completed.

24. An actuator, according to claim 11, wherein said guide track is profiled so that a second end of said first portion of said guide track is curved toward a direction of said axis to provide a moderate acceleration of such door panel when at least one of an opening motion is begun and a closing motion is completed.

25. An actuator, according to claim 11, wherein said at least one fluid connection to said first chamber includes a low impedance connection having a check valve for admitting fluid to said first chamber and a high impedance connection for exhausting fluid from said first chamber, said high impedance connection for controlling a rate of movement of such door panel.

26. An actuator, according to claim 25, wherein said high impedance connection includes an adjustable needle valve so that said rate of movement of such door panel may be adjusted.

27. An actuator, according to claim 11, wherein said at least one fluid connection to said second chamber includes a low impedance connection having a check valve for admitting fluid to said second chamber and a high impedance connection for exhausting fluid from said second chamber, said high impedance connection for controlling a rate of movement of such door panel.

28. An actuator, according to claim 27, wherein said high impedance connection includes an adjustable needle valve so that said rate of movement of such door panel may be adjusted.

29. An actuator, according to claim 11, in which such door panel moves downward to lock and said actuator further includes a spring mounted within said cylinder to engage said shaft and urge said shaft upward to support such door panel.

* * * * *